Oct. 27, 1970    H. C. RICE    3,536,313
INERTIA-OFFSET VEHICLE RIDE DAMPER
Filed Sept. 6, 1968    2 Sheets-Sheet 2

INVENTOR
HERBERT C. RICE

BY *William L. Fisher Esq.*
ATTORNEY

Oct. 27, 1970   H. C. RICE   3,536,313
INERTIA-OFFSET VEHICLE RIDE DAMPER
Filed Sept. 6, 1968   2 Sheets-Sheet 1
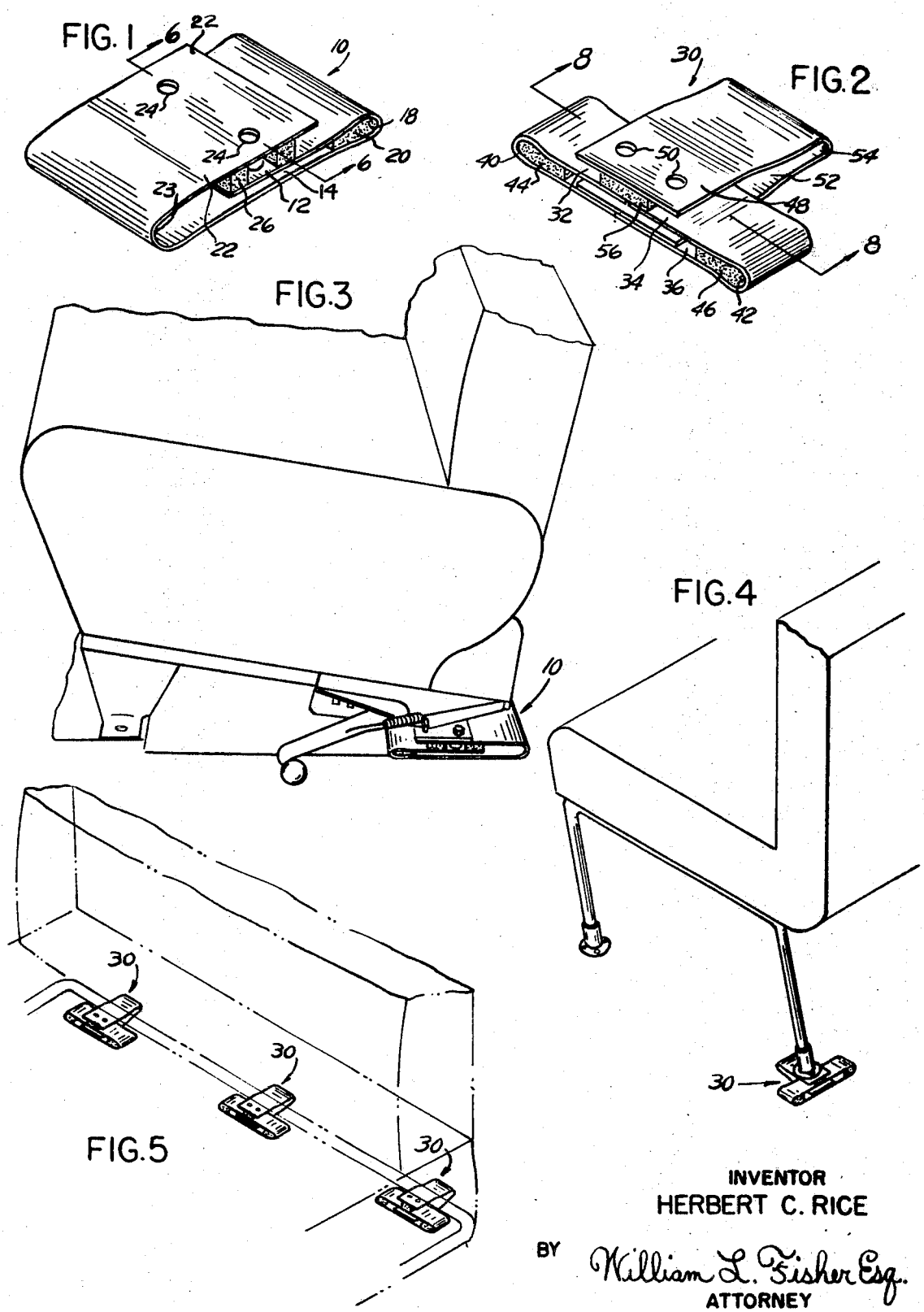
INVENTOR
HERBERT C. RICE
BY William L. Fisher Esq.
ATTORNEY

United States Patent Office 3,536,313
Patented Oct. 27, 1970

3,536,313
INERTIA-OFFSET VEHICLE RIDE DAMPER
Herbert C. Rice, 16940 Log Cabin, Detroit, Mich. 48203
Filed Sept. 6, 1968, Ser. No. 757,853
Int. Cl. F16f 1/20
U.S. Cl. 267—131      4 Claims

ABSTRACT OF THE DISCLOSURE

An inertia-offset vehicle ride damper is disclosed constructed to be inserted between a given vehicle structure and weight to be supported thereby and to absorb impact from road energy which would otherwise be transmitted to said weight, said ride damper comprising at least two metal energy absorbing plates each having a supported end and a free end, two of said free ends spaced from each other and disposed one above the other, at least one metal supporting plate spaced from and disposed beneath the lowermost one of said two free ends, means at each supported end which include a reverse band of metal integrally joining the respective energy absorbing plate and a supporting plate, a supporting plate and at least the uppermost one of said two free ends each having attaching means by which said ride damper can be attached, respectively, to said vehicle structure and to said supported weight, said two free ends constructed to have transmitted thereto off-set in respect to the respective supported ends the inertia of said weight, and a solid rubber energy absorbing member captured in place in the space between said two free ends, said rubber member in energy absorbing contact with both said two free ends.

---

My invention relates to vehicles.

The principal object of my invention is the provision of an inertia-offset vehicle ride damper constructed to be inserted between a given vehicle structure and weight to be supported thereby and to absorb impact from road energy which would otherwise be transmitted to said weight.

The foregoing object of my invention and its advantages will become apparent during the course of the following description, taken in conjunction with the accompanying drawings, in which:

FIG. 1 is a perspective view of an inertia-offset vehicle ride damper embodying my invention;

ture of FIG. 6 taken on the line 7—7 thereof;

FIG. 2 is a perspective view of another embodiment of an inertia-offset vehicle ride damper;

FIG. 3 is a perspective view showing said ride damper in use beneath a vehicle seat;

FIGS. 4 and 5 are perspective views showing said other embodiment in use beneath two different types of vehicle

Figure 8:
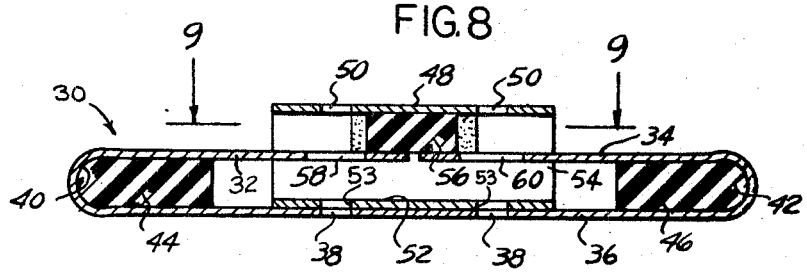
Figure 9:
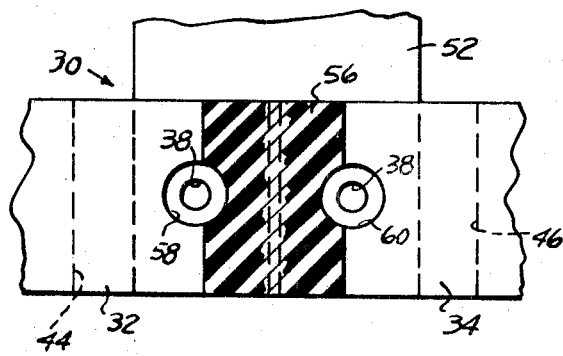

seats;

FIG. 8 is a transverse sectional view of the structure of FIG. 2 taken on the line 8—8 thereof; and FIG. 9 is a fragmentary view of a portion of the structure of FIG. 8 taken on the line 9—9 thereof.

PRINCIPLE OF OPERATION

Offset suspension provides leverage necessary for inertia of seat weight

Efficient dampening by the unit is accomplished by utilizing the principle of "Inertia and Leverage Effect of Offset Weight" in such a manner that rubber can be effectively employed in dampening road shock energy before reaching the seat cushion.

Inertia of seat weight or "lack of response" to road shock energy—in other words, increased riding comfort—is made possible by the unique design of the unit which provides yielding offset suspension for seat weight augmented by rubber medium.

Because it is offset, seat weight has leverage on the support ends of the unit, the result of which is to allow greater deflection of seat weight than would be the case if direct suspension of seat weight was employed.

The net result is that maximum impact from road shocks occurs at support ends of unit which respond to the feed-in and feed-out of road impact energy by movement in the deflection range created by seat weight and its powerful leverage.

The intensity of the impact reduces itself as it moves toward the area of seat support, by which time it has been reduced, by dissipation and dampening, to negligible proportions.

In other words, the area of seat weight suspension —being far less subject to the impact force from road shocks—remains in a state of inertia, highly conducive to the riding comfort of the vehicle.

The unique design of the unit provides yielding offset suspension of seat weight augmented by molded rubber members.

Because it is offset, seat weight has powerful leverage on the support ends of the unit. This leverage naturally creates greater deflection of seat weight than would direct suspension.

Thus a depth of inert-type deflection is created with high concentration of inertia directly under seat weight where leverage is greatest and where response to impact force from road shocks would be the minimum.

Support areas of the unit, along with rubber, respond readily to the feed-in and feed-out of road shock energy, by movement in the deflected range created by seat weight and its powerful leverage.

The effect of seat weight leverage and resultant greater deflection is to channel and confine road impact energy into support areas of the unit and its rubber members where it is efficiently absorbed and dampened.

Seat weight controls the action throughout, and intensity of road impact energy is "slowed to a walk" by the unique capability of the units to absorb and dampen, while seat weight remains in a state of intertia, the prime factor in riding comfort.

The unique design of the unit provides: (1) offset suspension of seatweight and (2) mounting of the unit directly under seatweight. The design of the unit and utilization of butyl type rubber accommodate arc travel of the free end of the unit during deflection cycle, eliminating need for ball joint type or other special provisions for handling arc travel.

Figure 6:
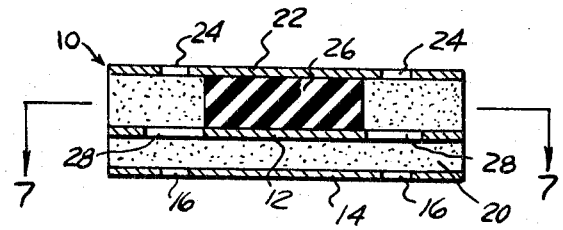
FIG. 6 is a transverse sectional view of the structure of FIG. 1 taken on the line 6—6 thereof.
Figure 7:
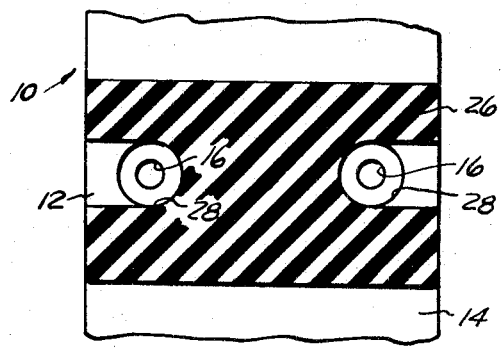
FIG. 7 is a fragmentary view of a portion of the structure.

Referring to the drawings in greater detail, 10 designates the embodiment of ride damper shown in FIGS. 1, 3 and 6 which comprises a metal energy absorbing plate 12 having a supported end and a free end. Said free end is constructed to have transmitted thereto offset in respect to said supported end the inertia of the weight to be supported. Said ride damper 10 also comprises a metal supporting plate 14 beneath and spaced from said energy absorbing plate 12. Said supporting plate 14 has attaching means in the form of fastening apertures 16 by which said ride damper can be attached to vehicle structure beneath the weight to be supported. Said ride damper 10 further comprises means at the supported end of said energy absorbing plate 12 which include a curved reverse bend 18 of metal integrally joining said energy absorbing plate 12 and said supporting plate 14 and a rubber energy absorbing member 20 captured in place in said reverse bend 18 in contact with said energy absorbing plate 12 and said supporting plate 14. The member 20 is molded of butyl rubber of the desired durometer and shape and may be bonded in place by well known methods. Said ride damper 10 further comprises a second metal energy absorbing plate 22 having a supported end and a free end. Said last-mentioned free end is constructed to have transmitted thereto offset in respect to its said supported end the inertia of said weight. Said second energy absorbing plate 22 has attaching means in the form of fastening apertures 24 by which said ride damper 10 can be attached to structure connected to said weight. Said ride damper 10 further comprises means at the supported end of said energy absorbing plate 22 which include a curved reverse bend 23 of metal integrally joining said energy absorbing plate 12 and said supporting plate 14. Said second energy absorbing plate 22 is disposed above and spaced from the first-mentioned energy absorbing plate 12 and a second rubber energy absorbing member 26 is captured in place between and in contact with said two energy absorbing plates 12 and 22. The energy absorbing member 26 has cut-out portions on the ends thereof to accommodate access apertures 28 in the energy absorbing plate 12. The access apertures 28 are disposed in vertical alignment with the fastening apertures 24 in the energy absorbing plate 22 and with the fastening apertures 16 in the supporting plate 16 to accommodate heads of fastening bolts.

FIG. 3 illustrates a use of said ride damper 10 at the rear left side of a vehicle seat with the supporting plate 14 fastened via the attaching means 16 to the floor of the vehicle and with the energy absorbing plate 22 fastened via the attaching means 24 to the seat adjuster of the vehicle seat frame. An identical ride damper would be fastened at the rear right side of the same vehicle seat. By virtue of the construction of said ride damper 10 the seat weight receives significantly diminished impact from road energy.

30 designates the embodiment of the ride damper shown in FIG. 2 and FIGS. 4–7 which comprises two metal energy absorbing plates 32 and 34 each having a supported end and a free end. The two free ends are constructed to have transmitted thereto together offset in respect to said supported ends the inertia of the weight to be supported. Said ride damper 30 also comprises a metal supporting plate 36 beneath and spaced from said two energy absorbing plates 32 and 34. Said supporting plate 36 has attaching means in the form of fastening apertures 38 by which said ride damper 30 can be attached to vehicle structure beneath the weight to be supported. Said ride damper further comprises means at the supported ends of said two energy absorbing plates 32 and 34 which include curved reverse bends 40 and 42 of metal integrally joining, respectively, said two energy absorbing plates 32 and 34 with said supporting plate 36 and rubber energy absorbing members 44 and 66 captured in place, respectively, in said reverse bends 40 and 42 in contact, respectively, with said two energy absorbing plates 32 and 34 and said supporting plate 34. Said ride damper 30 further comprises a third metal energy absorbing plate 48 having a supported end and a free end. Said last-mentioned free end is constructed to have transmitted thereto offset in respect to said last-mentioned supported end the inertia of said weight. Said third energy absorbing plate 48 has attaching means in the form of fastening apertures 50 by which said ride damper 30 can be attached to structure connected to said weight. Said ride damper 30 further comprises a second metal supporting plate 52 beneath and spaced from said third energy absorbing plate 48. Said second supporting plate 52 has attaching means in the form of fastening apertures 53 which coincide with the fastening apertures 38 in the first-mentioned supporting plate 36. Said second supporting plate 52 is attached to the first supporting plate and to vehicle structure beneath the weight to be supported via said fastening apertures 53. Said ride damper 30 further comprises means at the supported end of said third energy absorbing plate 48 which include a curved reverse bend 54 of metal integrally joining said third energy absorbing plate 48 and said second supporting plate 52. Said third energy absorbing plate 48 is disposed above and spaced from said two energy absorbing plates 32 and 34 and a third rubber energy absorbing member 56 is captured in place between and in contact with said two energy absorbing plates 32 and 34. The energy absorbing member 56 is disposed between access apertures 58 and 60 in said two energy absorbing plates 32 and 34, respectively. The access apertures 58 and 60 are disposed in vertical alignment with the fastening apertures 50 in the energy absorbing plate 48 and with the fastening apertures 53 and 38, respectively, in the supporting plates 36 and 52 to accommodate heads of fastening bolts.

FIG. 4 illustrates a use of said ride damper 30 at the rear left side of a vehicle seat with the two supporting plates 36 and 52 fastened via the attaching means 38 and 53, respectively, to the floor of the vehicle and with the energy absorbing plate 48 fastened via the attaching means 50 to a leg of the vehicle seat. An identical ride damper would be fastened at the rear right side of the same vehicle seat. FIG. 5 illustrates another use of a plurality of said ride dampers 30 at the rear of a vehicle seat with the rear frame bar of the vehicle seat supported commonly on the energy absorbing plate 48 of each ride damper 30 and with the two supporting plates 36 and 52 of each ride damper fastened via the attaching means thereon to the floor of the vehicle. By virtue of the construction described of said ride damper 30 the respective seat weight receives significantly diminished impact from road energy.

It will thus be seen that there has been provided by my invention an inertia-offset vehicle ride damper in which the object hereinabove set forth together with many thoroughly practical advantages has been successfully achieved. While preferred embodiments of my invention have been shown and described it is to be understood that variations and changes may be resorted to without departing from the spirit of my invention as defined by the appended claims.

What is claimed is:

1. An inertia-offset vehicle ride damper constructed to be inserted between a given vehicle structure and weight to be supported thereby and to absorb impact from road energy which would otherwise be transmitted to said weight, said ride damper comprising at least two metal energy absorbing plates each having a supported end and a free end, two of said free ends spaced from each other and disposed one above the other, at least one metal supporting plate spaced from and disposed beneath the lowermost one of said two free ends, means at each supported end which includes a reverse bend of metal integrally joining the respective energy absorbing plate and a supporting plate, a supporting plate and at least the uppermost one of said two free ends each having attaching means by which said ride damper can be attached, respectively, to said vehicle structure and to said supported weight, said two free ends constructed to have transmitted thereto off-set in respect to the respective supported ends the inertia of said weight, and a solid rubber energy absorbing member captured in place in the space between said two free ends, said rubber member in energy absorbing contact with both said two free ends.

2. An inertia-offset vehicle ride damper as claimed in claim 1, one supporting plate and two energy absorbing plates integral with said supporting plate, the two reverse bends of metal for said two energy absorbing plates oppositely facing each other and disposed at opposite ends of said supporting plate, said two energy absorbing plates extending toward each other from opposite ends of said supporting plate and having free ends spaced from each other and disposed one above the other, said rubber member in energy absorbing contact with both said free ends.

3. An inertia-offset vehicle ride damper as claimed in claim 1, a first supporting plate and two energy absorbing plates integral with said first supporting plate, the two reverse bends of metal for said two energy absorbing plates oppositely facing each other and disposed at opposite ends of said first supporting plate, said two energy absorbing plates extending toward each other from opposite ends of said first supporting plate and having free ends disposed in a common plane, a second supporting plate and a third energy absorbing plate integral with each other and displosed at right angles in respect to said first supporting plate and said two energy absorbing plates, said second supporting plate in face contact with said first supporting plate and the free end of said third energy absorbing plate spaced from and disposed above the free ends of said two energy absorbing members, said rubber member in energy absorbing contact with the free end of said third energy absorbing member and commonly with the free ends of said two energy absorbing plates.

4. An inertia-offset vehicle ride damper as claimed in claim 1, a second solid rubber energy absorbing member captured in place in and filling the space formed by at least one of said reverse bands, said second rubber member in energy absorbing contact with both a supporting plate and the respective energy absorbing plate.

References Cited

UNITED STATES PATENTS 2,846,713    8/1958    Shankwiler.
3,115,337   12/1963    Masgrave.

JAMES B. MARBERT, Primary Examiner